United States Patent
Jouan de Kervenoaël (10) Patent No.: US 6,337,547 B1
(45) Date of Patent: Jan. 8, 2002

(54) LINKING ELEMENT WITH SCREW JACK AND ITS USE FOR AN INDUSTRIAL ROBOT ARM

(75) Inventor: Tanguy Jouan de Kervenoaël, Neauphle le Chateau (FR)

(73) Assignees: Commissariat a l'Energie Atomique, Paris; Compagnie Generale des Matieres Nucleaires, Velizy-Villacoublay, both of (FR)

( * ) Notice: Subject to any disclaimer, the term of this patent is extended or adjusted under 35 U.S.C. 154(b) by 0 days.

(21) Appl. No.: 09/529,770
(22) PCT Filed: Aug. 18, 1999
(86) PCT No.: PCT/FR99/02008
  § 371 Date: Apr. 18, 2000
  § 102(e) Date: Apr. 18, 2000
(87) PCT Pub. No.: WO00/10775
  PCT Pub. Date: Mar. 2, 2000

(30) Foreign Application Priority Data
Aug. 19, 1998 (FR) .............................. 98 10549

(51) Int. Cl.$^7$ ................................. H02K 7/10
(52) U.S. Cl. .............. 318/15; 318/568.11; 318/568.21; 901/26
(58) Field of Search ............... 318/15, 568.11, 318/568.21; 901/26, 23, 28, 29

(56) References Cited

U.S. PATENT DOCUMENTS

| | | | | |
|---|---|---|---|---|
| 5,255,571 A | * | 10/1993 | Smith | 901/29 |
| 5,263,382 A | * | 11/1993 | Brooks et al. | 901/26 |
| 5,341,289 A | * | 8/1994 | Lee | 318/568.21 |

FOREIGN PATENT DOCUMENTS

| | | | |
|---|---|---|---|
| EP | 0 426 264 | 1/1987 | B25J/9/18 |
| EP | 0 654 325 | 6/1994 | B25J/9/06 |
| FR | 2220344 | 3/1973 | B23Q/5/00 |

* cited by examiner

*Primary Examiner*—Karen Masih
(74) *Attorney, Agent, or Firm*—Hayes, Soloway, Hennessey, Grossman & Hage PC (57) ABSTRACT

The linking component between two parts that contributes to maintaining them at a distance that is determined but adjustable comprises a jack with a screw and a nut. The movement of the jack is controlled by a motor. Universal joints are disposed between the two parts and the screw and the nut respectively, and the axes of rotation of one of the universal joints passes through the center of the nut. If play present in the assembly causes the screw to become skewed relative to the nut, the nut tilts freely until its axis is in line with that of the screw, thereby eliminating the flexion stresses caused by the cantilever on the screw. The component may be used to regulate the angle between two hinged sections of a robot arm.

9 Claims, 7 Drawing Sheets

LINKING ELEMENT WITH SCREW JACK AND ITS USE FOR AN INDUSTRIAL ROBOT ARM

The present invention relates to a linking component that mainly comprises a nut/screw jack, and a robot arm fitted with said component.

An essential advantage of nut/screw screw jacks is that they can be used to transmit accurate movements between the two components they link while resisting significant force. More precisely, one of the linked components is connected to the screw and the other component to a housing covering the nut in which the said nut is fitted by bearings that allow it to rotate. The housing also incorporates a motor that reacts to external commands to rotate the nut and thus displace the screw in translation, thereby bringing the two components together or moving them away from one another.

Although the relative rotation of the screw and the nut along an axis shared with the axis of the screw causes the translation movement required, it is, however, essential that the nut be subject to no rotation along an axis at right angles to the axis of the screw, i.e. along any axis located in the plane of symmetry of the nut. If this occurs the long thin screw bears on two diametrically opposed points on the nut which becomes skewed. The compression force to which the screw is subject causes it to buckle and also causes significant premature wear on the points of contact.

A jack must fulfil two functions: it must guide mechanical parts in translation and it must bring the said parts further from or closer to one another. A screw/nut system easily performs the second function but is poor at achieving the first. Guiding the nut in translation relative to the screw implies exercising rotation at right angles to the axis of the screw, which rapidly deteriorates the device. A simple solution consists in adding other mechanical components that fulfil the translational guidance function. For example, a slider mounted on the end of the screw; this has the drawback of doubling the length of the screw. Another solution is to use a sliding pivot link fitted parallel to the screw, or more generally a prism-shaped link can be fitted coaxially to the screw. In this last configuration the screw is a ball plate, which has the drawback of significantly increasing the diameter of the jack and destroying its axial symmetry. All these solutions significantly increase the size and weight of the assembly; they also require that the guiding components connected to the screw be precisely aligned with the screw along its entire translation course, which is physically impossible to achieve with any degree of accuracy. The closer one gets to achieving this, the more machining becomes costly and the bulkier the parts become.

The ideal solution therefore consists in an assembly that only allows axial translation force between the screw and the nut. This assembly must allow rotation of the screw/nut on the same axis as the screw while prohibiting any screw/nut rotation at right-angles to the axis of the screw, i.e. the axis located in the plane of symmetry of the screw.

This twofold problem does not appear to have been resolved yet with manufacturers of nut/screw jacks going no further than acknowledging that their products are incapable of resisting significant transversal force, thereby limiting their use or making it necessary to use very thick screws to resist any flexion caused by flexion stress.

The linking component proposed here provides a solution to this twofold problem, thereby making it possible to use nut/screw jacks irrespective of the direction of the forces exerted between the parts it links while preventing screw-nut rotation in the axis at right angles to the axis of the screw. The size and weight of nut/screw jacks can thus be reduced relative to those of the known art for two different reasons: there is no longer any need to choose a thick screw to resist flexion, and the linear guiding function between the screw and the sheath is omitted.

The linking component of the invention comprises a jack with a nut into which a screw is engaged, a sheath in which the nut is maintained by bearings such that it is free to rotate, a motor capable of producing rotation between the screw and the nut, and first and second linking means between the first component and the nut and between the second component and the screw. It is characterized in that the first and second connecting means consist of universal joints that each permit two axes of rotation perpendicular to the screw and the nut, and the axes of rotation of one of the universal joints converge towards the center of the nut. "Universal joints" are understood to mean transmission mechanisms with two joints, of which the hinge pins are fitted respectively to the parts connected by the universal joint (one of the two parts mentioned above, and the screw or nut) and are linked to one another by an intermediate component that maintains them perpendicular to one another. The main function of the universal joints is to transmit rotations between the components they connect while allowing for variations in the angle between the parts.

This type of linking component may be used in a robot arm, particularly in a connection between two consecutive sections that are hinged so as to form a variable angle, the axis of the hinge being perpendicular to the said sections; the jack is fitted between two lever arms of the said sections and brings them further from or closer to one another.

The linking component is particularly useful in narrow robot arms that are expected to pass through narrow openings, for example through protective housings. It is well known that the thickest parts of such arms are where two sections are hinged; this phenomenon is largely overcome in this invention, thereby retaining the narrowness of the arms.

Another advantageous characteristic of the invention is the resulting saving in weight, which becomes crucial when several components fitted with this type of joint need to be connected end to end. When the number of components is increased, the forces to which the first components in the chain are subjected rapidly become so great that this type of structure must in practice be limited to a very small number of sections.

Those skilled in the art will understand that, in order to be fine and dexterous, the structure of a mechanical arm must allow for the coexistence, and if possible the alternation, of a large number of components connected in sequence by two types of joint:

one type allowing rotation around the axis of the previous sections (the roll axis) and the other allowing rotation around an orthogonal axis (the pitch axis), the latter being slightly off-center relative to the axis of the previous component. The problems of pitch rotation have hitherto limited this type of structure to a limited number of components, not only because of the excessive thickness mentioned above, but also because of the rapid increase in weight, and hence the force required, as the number of sections grows.

The invention thus makes it possible to construct a fine, dexterous arm capable of passing through small-diameter openings and comprising more than three modular components including:

- a narrow hollow section, which is advantageously cylindrical or prismatic in cross-section,
- a mechanical device advantageously positioned at the distal end of the section and allowing rotation around the axis of symmetry of the section or a longitudinal axis, a mechanical device allowing rotation around an axis orthogonal to the previous axis and advantageously offset, this section using the jack described above, and connecting this modular component to the next in the sequence.

The order in which these components are mounted may be reversed without going outside the scope of the invention.

If the number of modules mounted end to end increases, the power developed in the jack must be increased slightly, which somewhat limits the modularity of the invention; however, slight changes of power make it possible to build an arm comprising three or more of these components.

Another aspect of the invention is the measurement of forces. This is particularly desirable for dexterous arms operating in hostile environments, firstly to give accurate control over the maneuvers to be carried out, and secondly because, given the great reversible capacity of the jack, any collisions can easily be detected; this information is very useful for safety purposes.

The jack of the present invention can be used to create an assembly that only allows axial translation force between the screw and the nut. This has a secondary advantage in that it allows for very easy measurement of the traction or compression forces exerted by the jack without any interference from other mechanical forces. All that is required is to measure the traction or compression forces exerted on the screw itself. In a preferred embodiment a flat spot is machined onto the screw itself in the region of the fastening-point and two or four extensometers are bonded onto the flat spot. The measurements taken in this way are remarkably free from interference.

The same principle, of isolating the mechanical force to be measured, has been extended to the other joints of the arm, i.e. those that allow for roll movement. To do this, an additional device is used to separate the torque transmitted from any other mechanical force, thereby excluding any interference. This device consists of an incoming pin connected to a disk-shaped component, and a outgoing pin connected to another disk-shaped component. The two disks are placed facing one another and each is fitted by means of a ball-joint with a small connecting rod to which the transferred torque applies pure traction or compression stresses. This is achieved by locating the connecting rod in a plane that is precisely perpendicular to the axis along which the torque is transmitted and in an orthoradial direction. This assumes that the two disk-shaped components are fitted with a projection to position the ends of the connecting rod accurately. The connecting rod can then be fitted with any type of stress-measuring apparatus, a preferred embodiment consisting of two or four extensometers bonded onto the connecting rod.

The invention also relates to a modular robot arm structure consisting of at least three components of virtually identical diameter. Each of these components comprises a section, a joint allowing for roll rotation coaxial to the section, and a joint allowing for pitch rotation orthogonal to the axis of the section and offset from the section. Most of the linking section described above may essentially be contained inside the sections and constitute the pitch joint.

The aims and advantages of the present invention will be better understood from the following detailed description of the attached Figures where.

Figure 8:
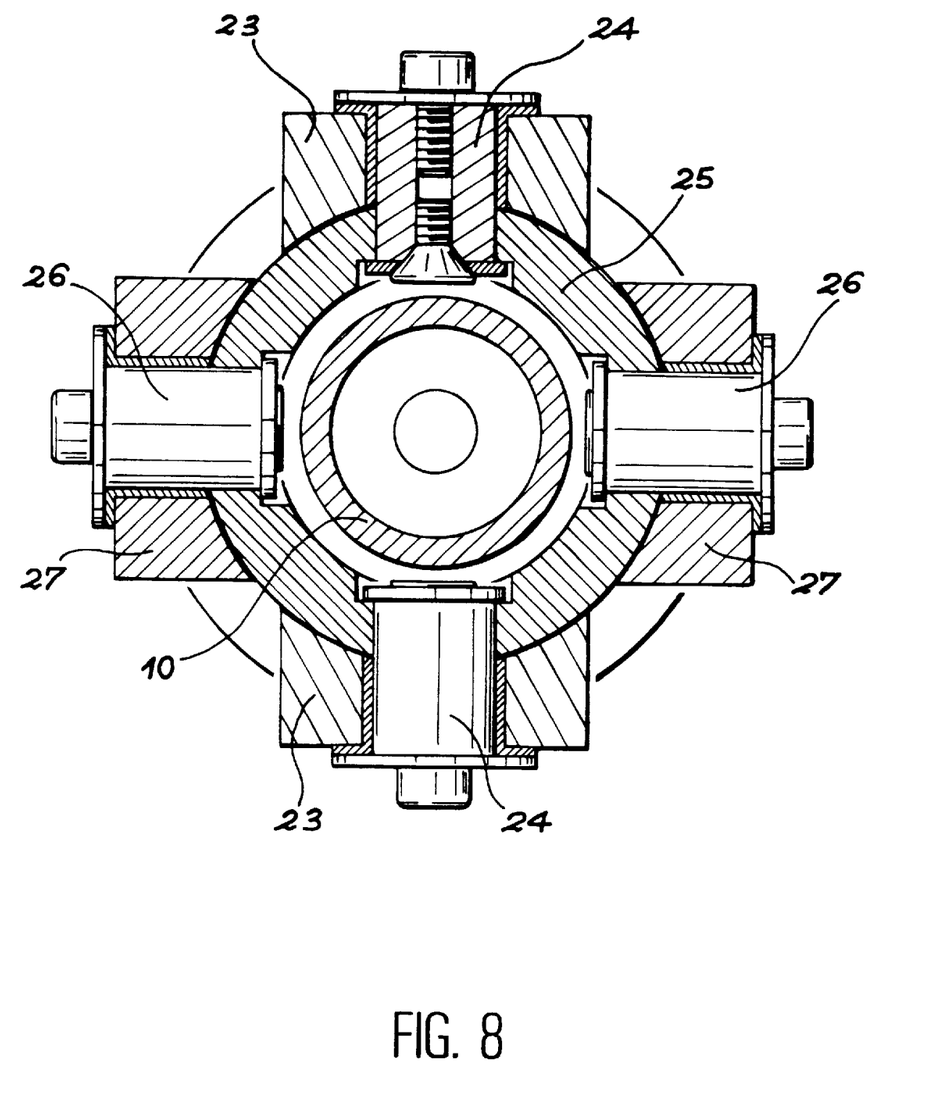
FIG. 8 is a cross-section through the linking component perpendicular to that of FIG. 1.

The nut/screw linking component will now be described with reference to FIG. 1. The component is located between two parts A and B and can control the distance between them along the axis of screw 1; the two parts can transmit stress to the screw from any direction. Screw 1 is connected to one of the parts A by an ordinary universal joint 2 comprising two pins 3 and 4 that are perpendicular to one another, a first fork 5 fastened to part A and hinged around pin 3, a journal cross 6 fastened to both pins 3 and 4 and a second fork 7 carried by pin 4 in which the end 8 of screw 1 is held firmly. Screw 1 is threaded through a nut 9 held in a cylindrical sheath 10 and held in place by a cover 11 threaded into the end of sheath 10 and pierced to allow the screw 1 to pass through. Finally, pin 4 is perpendicular to screw 1. Beyond nut 9 sheath 10 comprises a neck 12 into which the opposite end of screw 1 to part A fits. Two oblique roller bearings 13 and 14 are fitted around neck 12 and placed in a housing in body 15 of the linking component. This body 15 also comprises a motor 16. This motor is located outside the housing and its output shaft 17 is parallel to screw 1 and drives a wheel 18. A powered wheel 19 is connected to wheel 18 by a belt 20 and fitted around the end of neck 12, to which it is connected by means of a key 21. Neck 12 extends outside body 15. Motor 16 thus drives wheels 18 and 19, neck 12, sheath 10 and nut 9 that is fastened to sheath 10 to cause screw 1 to A second universal joint 22 is placed between body 15 and the other part B. More precisely, body 15 is extended by a first fork 23 that reaches as far as the first pin 24 of universal joint 22 to which it is hinged, and a journal cross 25 is connected both to first pin 24 and to a second pin 26 which is also hinged to a second fork 27 connected to part B by a flange 28 (this arrangement can be seen clearly in FIG. 8). Pins 24 and 27 are perpendicular to one another and disposed in the same plane and their axes of rotation meet at the center 0 of nut 9. This arrangement enables nut 9 to align with screw 1 when the latter is disposed at an angle in nut 9 since the latter then turns freely around center 0 in the second universal joint 22 by yielding to the tipping moments applied to it and carrying with it body 15 and motor 16 in particular. These movements cause the absorption of the tipping moments which would otherwise have continued, manifesting as destructive flexion moments applied to screw 1. To summarize, the invention enables screw 1 and nut 9 to always adopt any orientation that releases the transversal force applied to them without parts 1 and B moving.

Figures 2, 3:
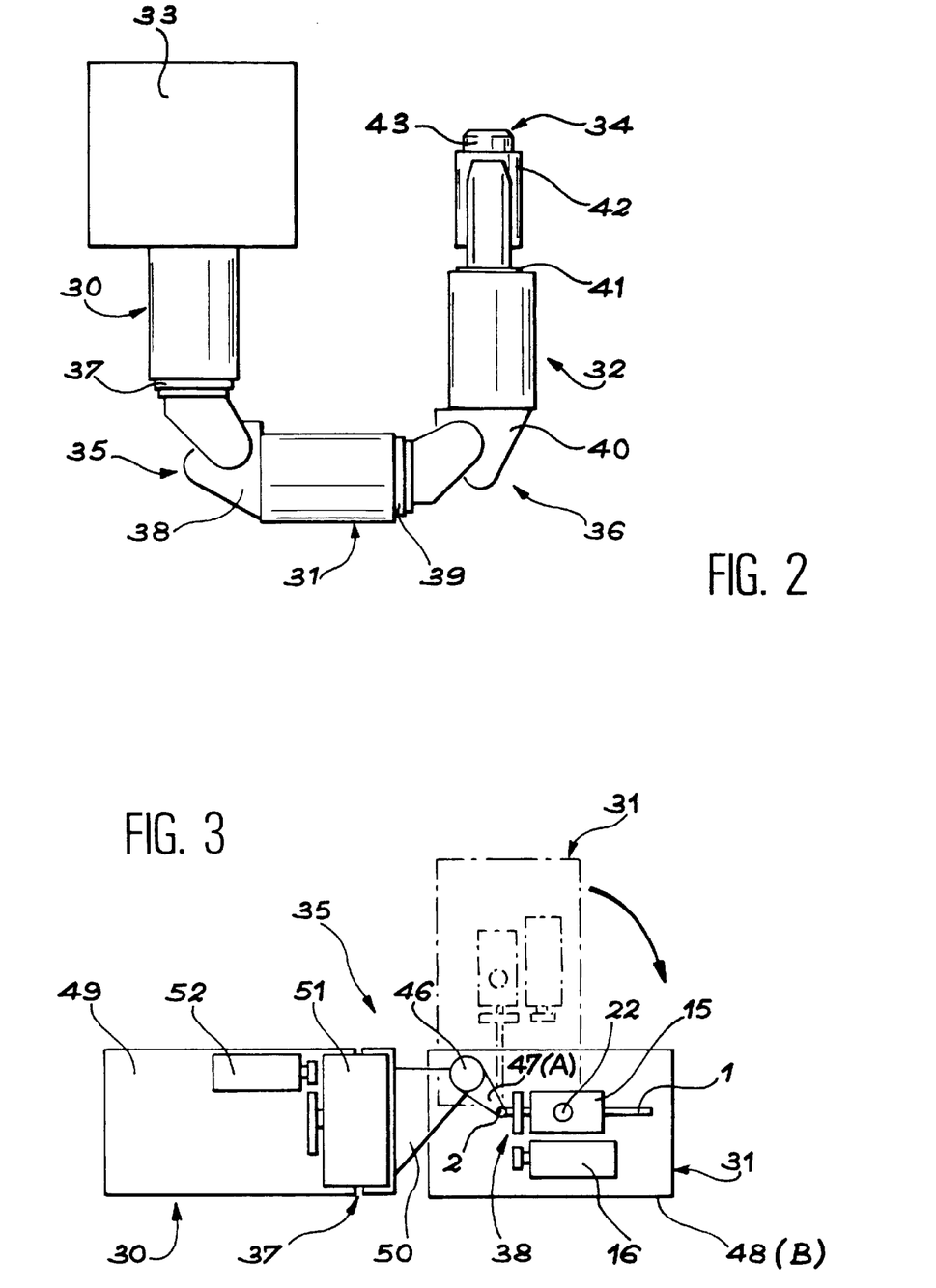
FIG. 2 is an overall view of a robot arm.
FIG. 3 shows how the linking component is installed in a robot arm joint.

Possible applications of the linking component of the invention will now be described. One such application is to a robot arm known as "dexterous" in the specialist language of the field. This type of arm is very flexible and can pass through narrow openings. One such arm is shown in FIG. 2. The arm consists of three sections, 30, 31 and 32 located between a movable base 33 and an end wrist 34. Sections 30, 31 and 32 are connected by a shoulder 35 and an elbow 36, thus named by analogy with the human arm. Shoulder 35 and elbow 36 each comprise a hinged joint 37 or 39, also known as a roll joint, and a bending joint 38 or 40 of the arm, also known as a pitch joint. Finally the wrist 34 is fitted with its own joints, namely a roll joint 41, a pitch joint 42 and a final roll joint 43. The first two joints are located at the end of section 32 and the last at the end of wrist 34, enabling it to rotate a tool or other object gripped by it.

Figure 1:
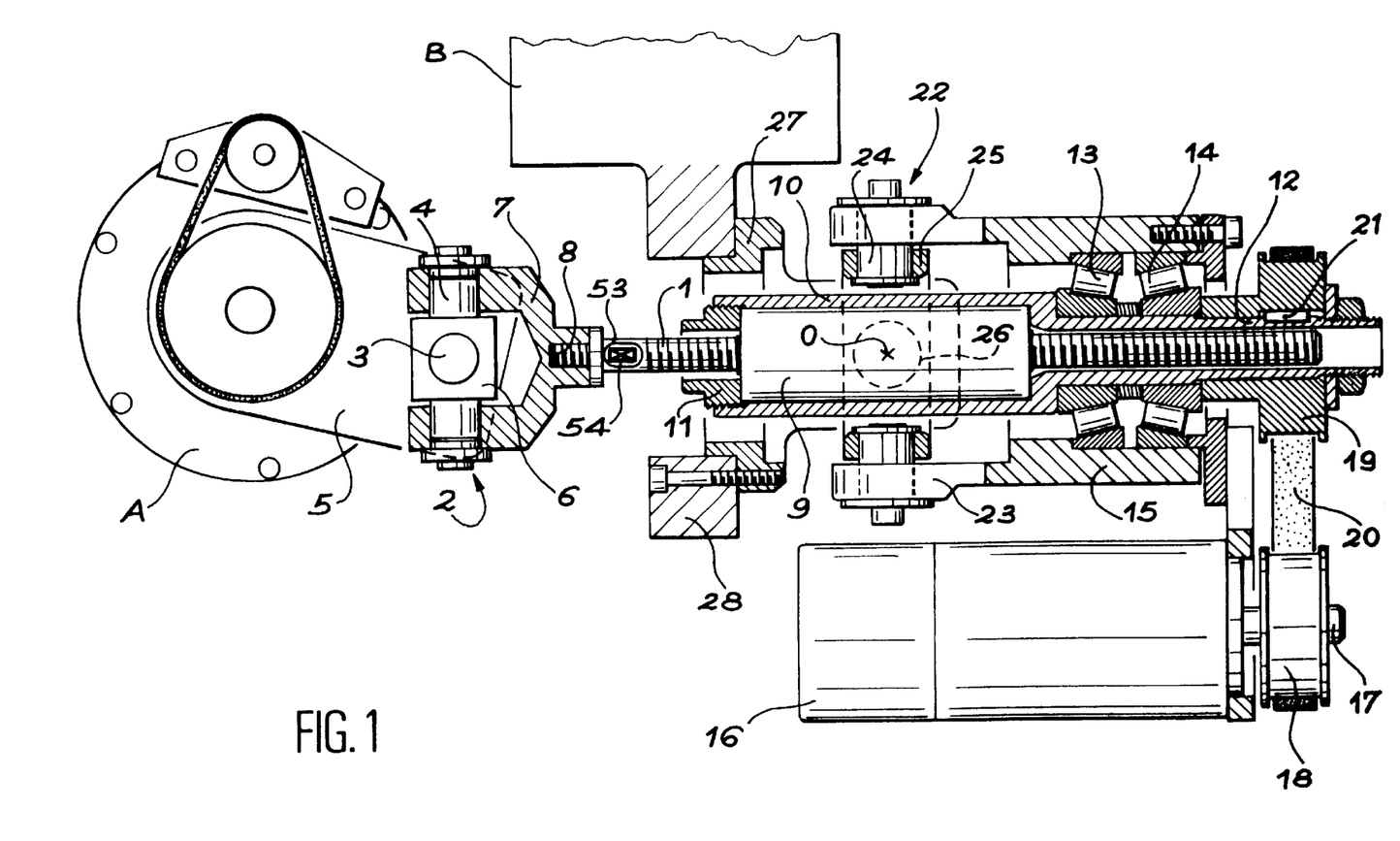
FIG. 1 is an overall view of a linking component of the invention.

The linking component of FIG. 1 is preferably incorporated in pitch joints 38, 40 or 42 as shown in FIG. 3 which shows, for example, shoulder 35; elbow 36 and wrist 34 are mounted virtually identically.

Sections 30 and 31 and connected by a hinge 46 fitted to their common ends; part A is a lever 47 which terminates section 30 after hinge 46, and part B is the housing 48 of section 31. Particular care has been taken to show the locations of universal joints 2 and 22, together with screw 1, motor 16 and body 15 of nut 9. It will be noticed that screw 1 remains perpendicular to hinge 46. The first section 30 consists of two portions: a first portion that may be called the main portion 49 because of its length and a transitional portion 50 that extends partially into section 31 as far as hinge 46, comprises lever 47 and in fact acts as a linking component between the second section 31 and main portion 49 of first section 30. Roll joint 37 is placed between portions 49 and 50 and comprises a specialized reducer known as a "harmonic drive" 51 which is fitted between the two portions 49 and 50 to support them. Reducer 51 is driven by a motor 52 located inside main portion 49.

Reducer 51 is roughly cylindrical in shape and small in size; it is specially designed for roll joints and its main advantage is that it does not increase the thickness of the arm. Due to use of the invention the linking component that constitutes pitch joint 38 is also small in size; it will be seen that screw 1, body 15 and motor 16 extend longitudinally some way into section 31, which is not a drawback, but are of small width thereby allowing section 31 to be narrow. If it had been decided, for example, to use a different harmonic reducer 51 for pitch joint 38 it would have been necessary to dispose it with its rotation pins parallel to hinge 46 or perpendicular to the plane of the Figure; this would have caused major structural problems since the drive motor of said reducer could not have been positioned like motor 52 facing reducer 51 without jutting out to an unacceptable degree. The motor would have to be disposed more or less like motor 16 but an additional movement transmission system would have to be added between the motor and harmonic reducer 51.

The nut/screw linking component makes it possible to transmit significant forces between sections 30 and 31 and to impose accurate movements that are not subject to misadjustment. The displacement angle between sections 30 and 31 may be large (at least 90° in practice) as can be seen from the two positions shown in FIG. 3.

Figure 4:
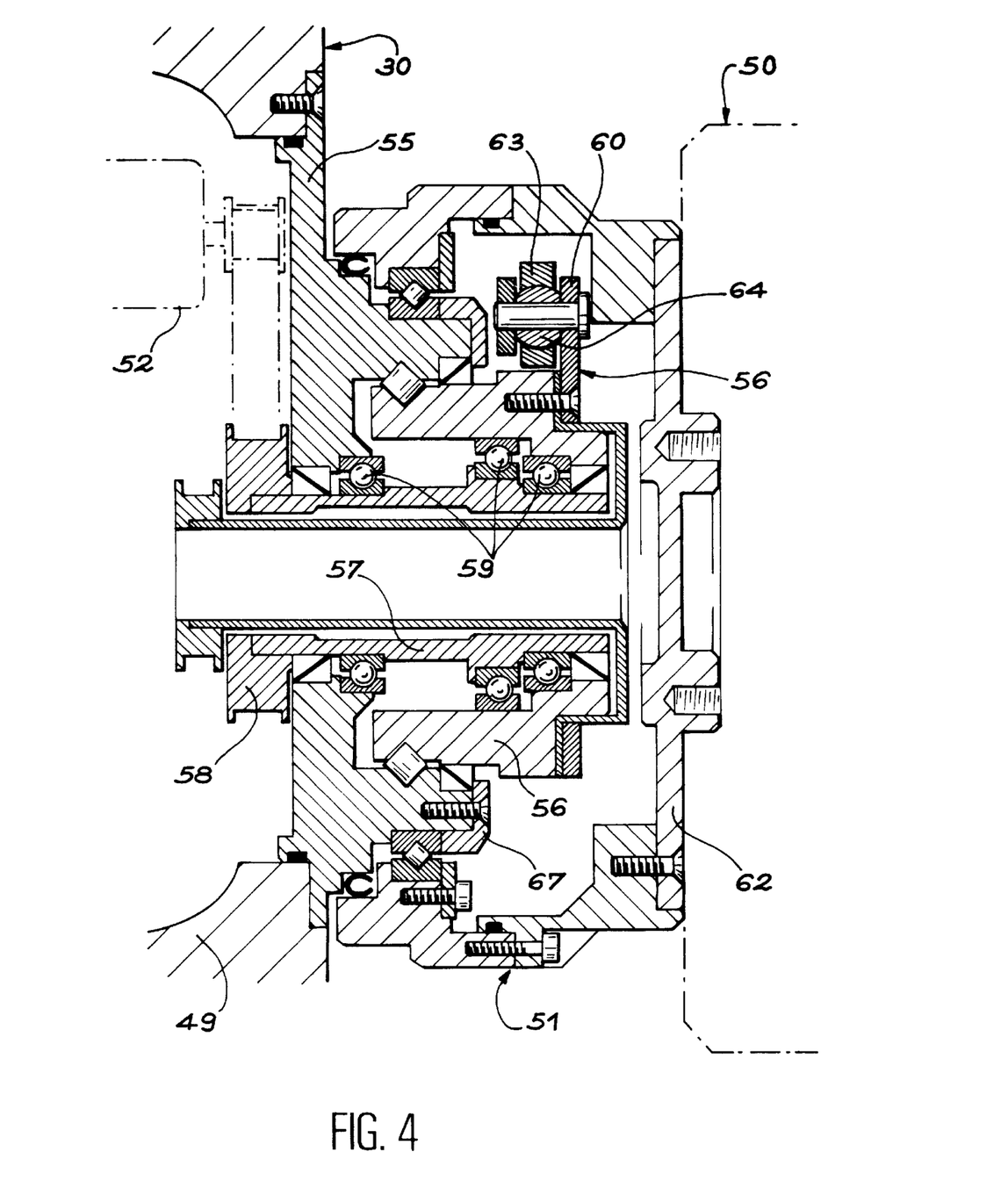
FIGS. 4 and 5 show a device for measuring the pivoting force applied to a robot arm joint.
Figure 5:
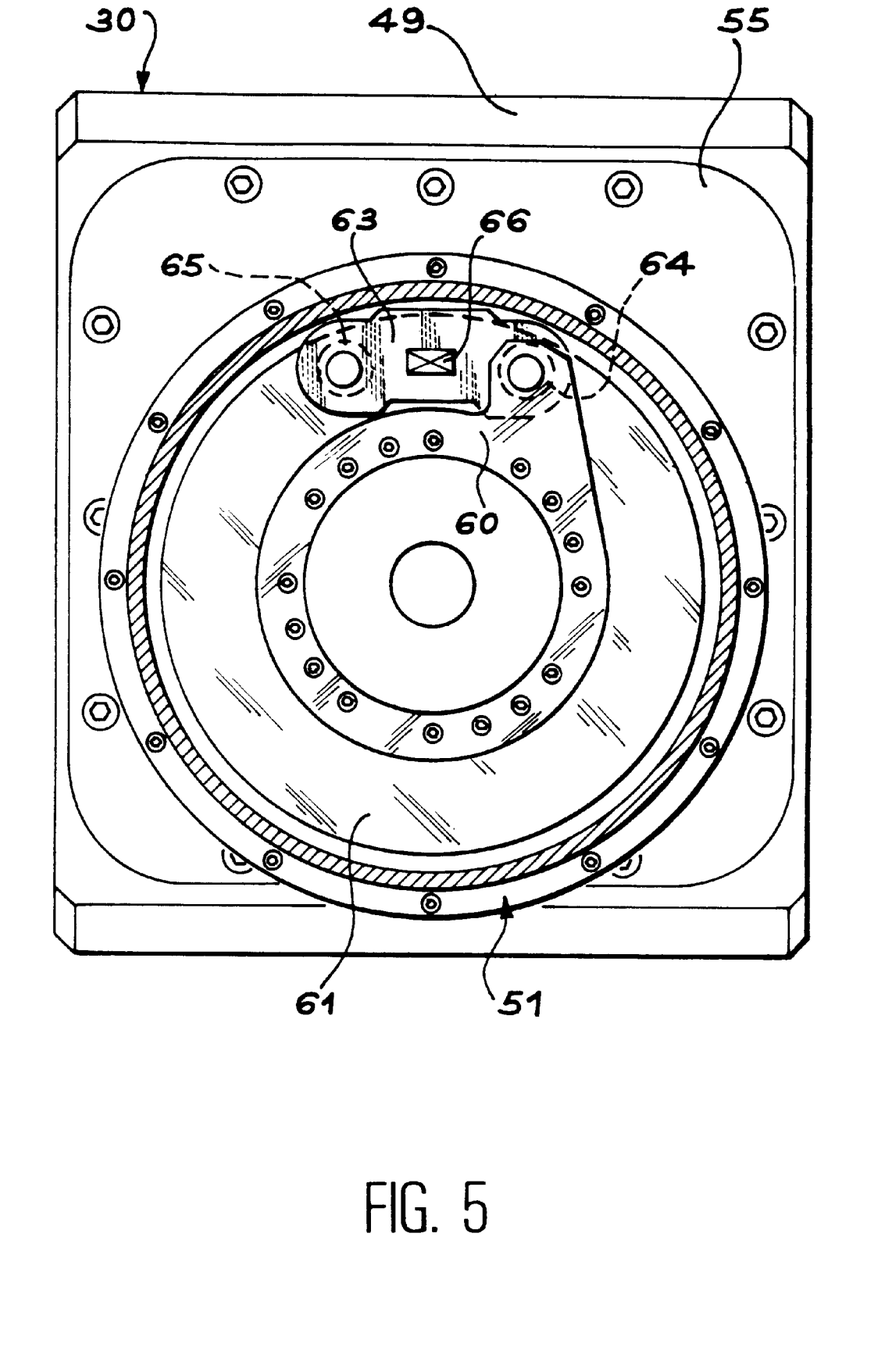

The way in which the forces applied to the joints are measured will now be described with reference to FIGS. 1, 4 and 5.

Stress gauges are used for both the roll and pitch joints. Concerning the pitch joint, screw 1 is provided with a flat spot 53 near first universal joint 2. This flat spot is provided more precisely between the first part A and nut 9. At least one gauge 54 is bonded to the flat spot and oriented so that it can measure the traction and compression strains on screw 1 between first universal joint 2 and nut 9.

A more complex device is preferably used for roll joints, on which the forces consist principally of torsion strains exerted on the shafts. A standard procedure consists in measuring these torsion strains using gauges bonded to the surface of the shafts at an angle of 45° to the axis, i.e. in the direction of the main torsion elongations. But it has been found that this procedure is very difficult to put into practice since great accuracy is needed when orienting the gauges and there are always significant failures of accuracy. This is why a different procedure is proposed here (FIGS. 4 and 5). Harmonic reducer 51 comprises a first reducer portion 55 fastened to the main portion 49 of section 30, a second reducer portion 56 fastened to the end portion 50 of section 30 and a drive shaft 57 the end of which bears a wheel 58 driven by motor 52, supported by the reducer portions 55 and 56 by bearings 59, which drives second portion 56 at a speed different from its own by means of a gear system (not shown). Since the harmonic reducer 51 is available commercially no complete description is necessary.

Second reducer portion 56 is fitted with a disk 60 which extends in a plane perpendicular to drive shaft 57 and a second disk 61 that is parallel and coaxial to the first is screwed to a housing 62 of reducer 51 adjacent to the end portion 50. Disks 61 and 62 are linked by a small connecting rod 63 that is fitted to disks 60 and 61 by joints 64 and 65 respectively and oriented tangentially to the rotational movement of disks 60 and 61. All the forces transmitted by drive shaft 57 to end portion 50 thus pass through connecting rod 63 which is stretched or compressed between joints 64 and 65. All that is required is to bond gauges 66 to the surface of connecting rod 63 to obtain very accurate measurements of the stresses and to deduce from these measurements the forces applied to the roll joint. Joints 64 and 65 ensure that connecting rod 63 is subject to no forces other than traction or compression, thereby guaranteeing that the gauges 66 accurately measure the forces applied to connecting rod 63. A single gauge 1 or 66 has been shown each time, but it is usual to bond several gauges side by side and take the mean of their readings. Alternatively a second gauge can be bonded to the other side of the supporting component, here screw 1 or connecting rod 63.

It is known that the stresses on the strain gauges are measured by passing an electric current through the wires constituting the sensitive parts of the gauge and then measuring the variations in resistance of said wires relative to the stresses. There are various ways of providing an electricity supply and of taking measurements on the movable gauges, the simplest of which consists in using electrical connections comprising conducting paths and brushes that move along said conducting paths as the gauges are displaced. In the present case such paths may consist of circular paths disposed on one surface 67 of first reducer portion 55 that is oriented towards connecting rod 63; for the pitch joint conducting paths may be disposed on the inner surface of housing 48 of section 31 at the point where flat spot 53 and gauge 54 displace.

Figure 6:
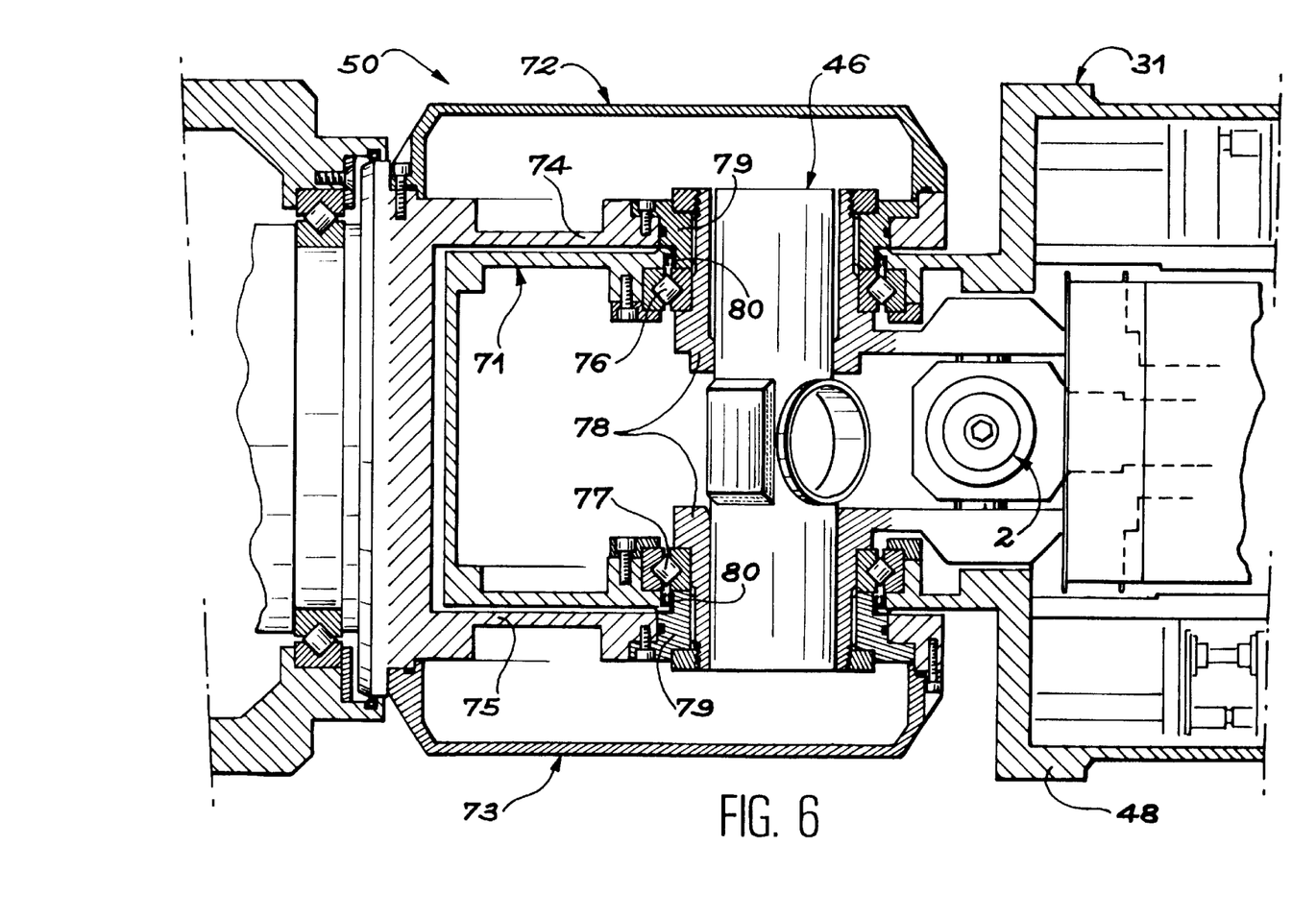
FIGS. 6 and 7 show a robot arm joint with excellent leaktightness characteristics.
Figure 7:
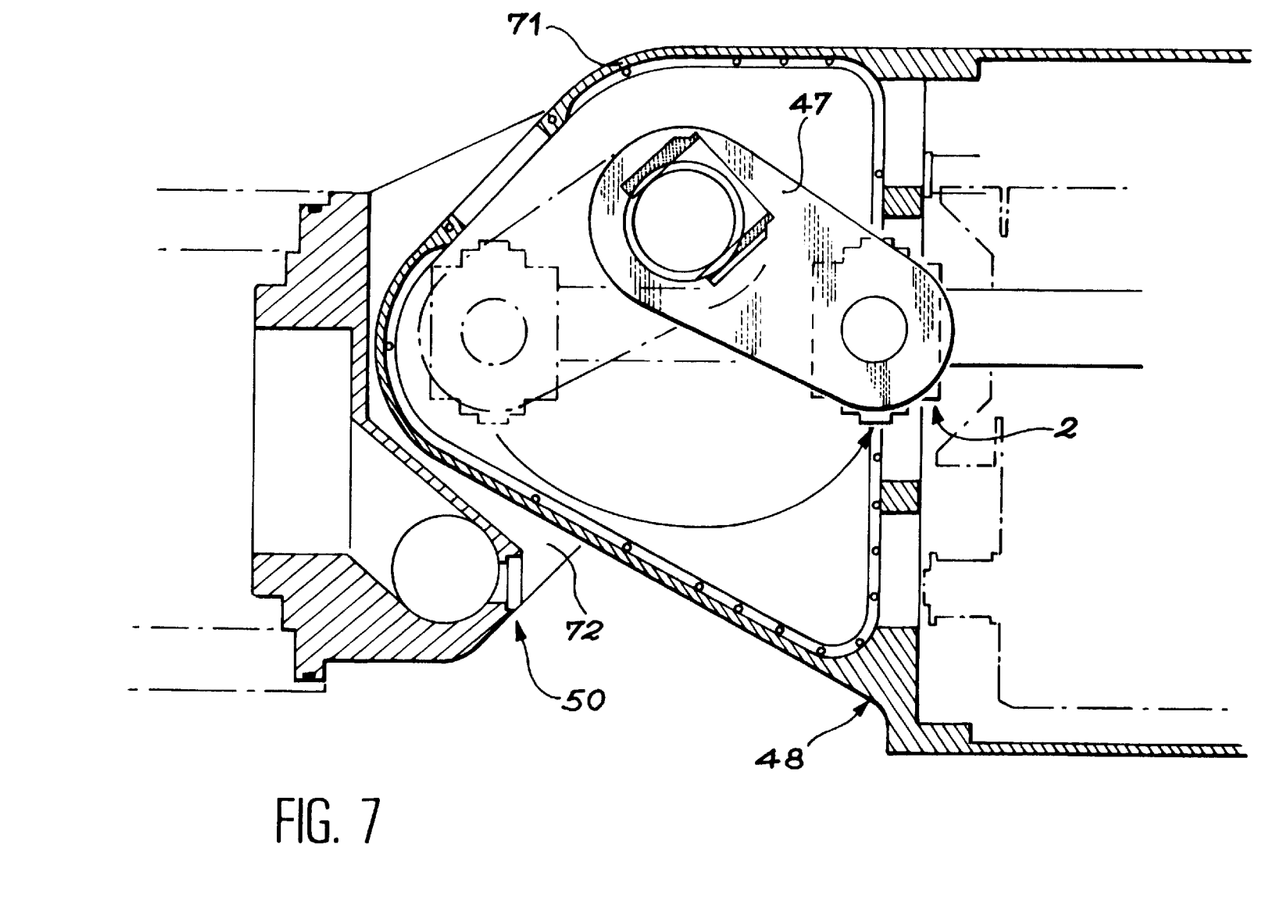

A final aspect of the invention will now be described with reference to FIGS. 6 and 7. These Figures show an assembly that easily ensures the leaktightness of the pitch joint. For this purpose housing 48 terminates in a chamber housing 71 which contains lever 47 and in which universal joint 2 moves as a result of movements of screw 1. More precisely, the housing of chamber 71 rotates around lever 47, which thus occupies a variable position.

The housing of chamber 71 has two opposite surfaces which are covered by flanges 72 and 73 of a fork that forms the structure of end portion 50. Flanges 72 and 73 are concave and hinge 46 passes through their inner walls 74 and 75 as well as those of chamber housing 71 through openings cut in them.

Hinge 46 is supported in the wall of chamber housing 71 by a pair of bearings 76 and 77 of which the inner rings are axially enclosed between the shoulders 78 of hinge 46 and the shoulders 79 of walls 74 and 75. Leaktightness is ensured by lip seals 80 placed between shoulders 79 and the openings in the housing of chamber 71. It will be seen that the protection afforded by flanges 72 and 73, together with the smallness of the openings in the housing of chamber 71, greatly reduces the risk of dirt finding its way into housings 48 or 71. Flanges 72 and 73 run very close to the housing of chamber 71 and their outer walls are continuous because hinge 46 terminates underneath them.

What is claimed is:

1. Linking component connecting a first part and a second part, comprising a jack with a nut and a screw passing through the nut, a jack body in which the nut is supported by bearings such that the nut is free to rotate, a motor for causing rotation between the screw and the nut, and first and second universal joints for connecting the first part to the screw and the second part to the nut, said universal joints each having two axes of rotation perpendicular to the screw and the nut, and the axes of rotation of one of the universal joints meeting at the center of the nut.

2. Robot arm comprising at least one linking component connecting consecutive sections of the arm, said linking component comprising a jack with a nut and a screw passing through the nut, a jack body in which the nut is supported by bearings such that the nut is free to rotate, a motor capable of causing rotations between the screw and the nut, and first and second universal joints for connecting a first section to the screw and a second section to the nut, said universal joints each having two axes of rotation perpendicular to the screw and the nut, and the axes of rotation of one of the universal joints meeting at the center of the nut.

3. Robot arm of claim 2, wherein the sections of the arm are connected to one another by a first hinge, the screw being perpendicular to the first hinge and kept remote from it by a lever arm.

4. Robot arm of claim 3, wherein the linking component is housed inside a first section, and further comprising a second section comprising a main portion and an intermediate portion disposed between the first section and the main portion, the intermediate portion bearing a lever arm and being connected to the main portion by a second joint that is perpendicular to first joint.

5. Robot arm of claim 4, and further comprising a device for measuring force disposed inside the linking component and the second joint.

6. Robot arm of claim 4, and further comprising a device for measuring force disposed inside the linking component, said device comprising at least one stress gauge bonded to a flat spot on the screw between the nut and the first part.

7. Robot arm of claim 4, and further comprising a device for measuring force disposed inside the second joint, said device comprising at least one stress gauge, two coaxial rotating components fastened to the sections, and a connecting rod fastened to the said rotating components by joints, and wherein the stress gauge is fixed to the connecting rod.

8. Robot arm of claim 3, wherein the first joint comprises a hinge that extends beyond a portion of the housing of a first section, one of the other sections having concave flanges covering two opposite surfaces of the portion of the housing in which the hinge terminates, and seals are disposed in openings of the portion of the housing and around the hinge.

9. Modular robot arm structure composed of at least three elements, said elements each comprising a section, a roll joint that rotates coaxially relative to the section, and a pitch joint with an axis of rotation that is orthogonal to the axis of the section and offset relative to the section, wherein the pitch joints are driven by linking components comprising a jack with a nut and a screw passing through the nut, a jack body in which the nut is supported by bearings such that the nut is free to rotate, a motor capable of causing rotation between the screw and the nut, and first and second universal joints for connecting the first part to the screw and the second part to the nut, wherein the said first and second universal joints each have two axes of rotation perpendicular to the screw and the nut, and wherein the axes of rotation of one of the universal joints meet at the center of the nut.

* * * * *